Figure 1:
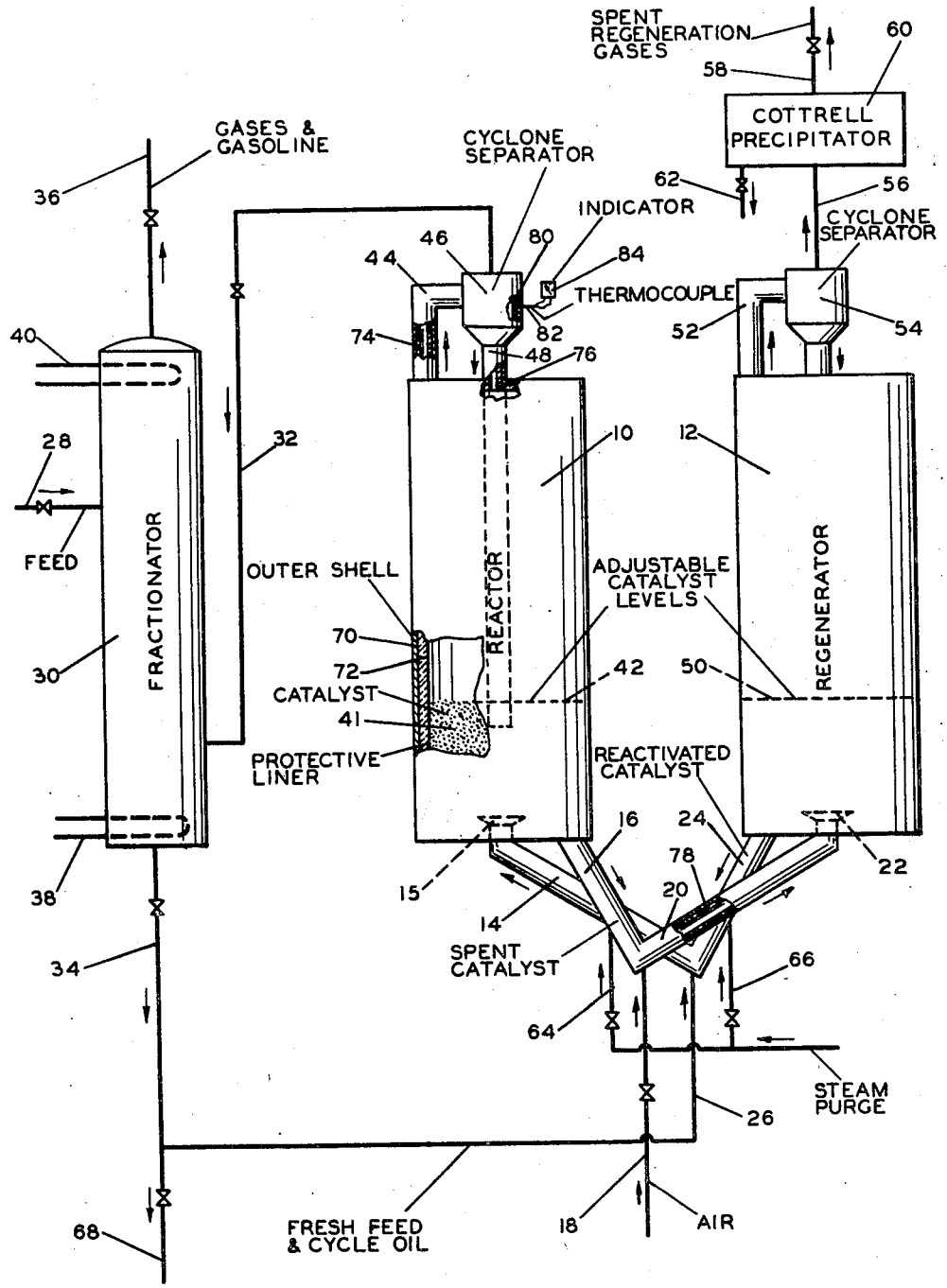

Nov. 23, 1954   J. D. UPHAM   2,695,219
DETECTION OF CORROSION AND DAMAGE TO APPARATUS
Filed Jan. 4, 1949   2 Sheets-Sheet 1

INVENTOR
J. D. UPHAM
BY Hudson and Young
ATTORNEYS

United States Patent Office 2,695,219
Patented Nov. 23, 1954

2,695,219

DETECTION OF CORROSION AND DAMAGE TO APPARATUS

John D. Upham, Bartlesville, Okla., assignor to Phillips Petroleum Company, a corporation of Delaware Application January 4, 1949, Serial No. 69,166

2 Claims. (Cl. 23—288)

This invention relates to a process and apparatus wherein material, such as a catalyst, is moved under conditions normally tending to cause corrosion and/or erosion of the apparatus. A specific modification involves the prevention of corrosion and/or erosion of the walls of reaction chamber, conduits, baffles, or other portions of the apparatus wherein a mobile corrosive catalyst is employed. As used in the appended claims the term "corrosion" and related words refer to corrosion by either chemical action or mechanical wearing away, as by erosion, or both. Certain preferred aspects of the invention pertain to detecting changes in the characteristics of a vessel lining caused by erosion, cracking, or by-passing of hot gases behind the lining. Other specific aspects pertain to detecting hydrate and similar deposits on cold heat exchange surfaces.

In catalytic conversions utilizing liquid, and especially solid, catalysts in which the catalyst is suspended, dispersed, or dissolved in a flowing stream of reactant fluids, or otherwise caused to move through the apparatus, the catalyst composition utilized or a component thereof frequently causes corrosive and/or erosive effects due to either chemical or physical properties thereof, or both, emphasized by the fluent conditions of use. These features are influenced by others such as high stream velocities, turbulent flow, high operating temperatures, and the like. The corrosive and erosive effects are particularly noticeable in the presence of solid suspended catalyst utilized in either gaseous or liquid phase reactants, and especially so where the catalyst itself, the reactants, promoters, and/or products of reaction have a tendency to chemically attack walls of the reaction vessels and other equipment.

The invention has particular utility in hydrocarbon conversions where such problems are frequently encountered, and a preferred embodiment of the invention will be described with specific reference to a particular type of hydrocarbon conversion effected with a particular type of catalyst, namely the so-called "fluid" cracking of hydrocarbon oils, in which a finely powdered solid cracking catalyst is passed through the system. However, it will be seen that the principles of the invention may be applied to other processes and/or apparatus wherein similar problems are encountered and the necessary modifications will readily be made by one skilled in the art in view of the detailed disclosure herein.

In the "fluid" cracking systems which have recently come into commercial use, solid cracking catalyst in the form of a powder, such as 200–400 mesh, is continuously passed through the apparatus at least partially suspended in hot gases. A hydrocarbon vapor carrying suspended catalyst powder is flowed through a conversion zone at cracking temperatures, usually in the range of 800–1150° F., spent catalyst is separated from products as in a cyclone separator or its equivalent, the spent catalyst powder is purged and then reactivated by passage through a regeneration zone while suspended in hot oxygen-containing gases which effect removal of carbonaceous matter from the catalyst by combustion, at temperatures from say 900° to 1400° F., and the active catalyst is separated from spent regeneration gases, purged, and returned to the conversion zone for re-use. A bed of the catalyst may be maintained in the lower portions of each zone, with said beds being continuously replenished by flow of catalyst into and from the lower part of the zone. In such instances the hot hydrocarbon vapors on the one hand and hot regeneration gas on the other hand flow up through the beds and carry substantial amounts of the powdered catalyst in suspension into the upper parts of the chambers. This suspended catalyst is separated from effluent gases, and may be returned either to the same zone or to the other zone. In other cases, the reaction and regeneration zones may contain catalyst only in complete suspension in the gases, that is there is no bed of catalyst maintained. In either case, the catalyst flows through the system much as would a fluid, hence the name, and the particles continuously move through the equipment at elevated temperatures and in some places at least at fairly high velocities. As a consequence, in conventional practice appreciable erosion of equipment occurs in both the regeneration and reaction zones as well as in conduits and other parts of the apparatus carrying streams of the solid catalyst particles.

Not only is the equipment itself worn away with consequent danger of failure which will at least force a shutdown for replacement and may result in a disastrous fire, but particles of undesirable extraneous material, usually metal, become mixed with the catalyst and/or reactants.

Another method of cracking or otherwise converting hydrocarbons utilizing a mobile catalyst uses a moving bed of catalyst, and is exemplified by the so-called "TCC" method, wherein catalyst of fairly large particle size, such as 4–60 mesh, is caused to flow by gravity through reaction and regeneration chambers, generally countercurrent to the gas flow therein. Usually the catalyst is lifted from the bottom of one chamber to the top of another by bucket-type chain elevators or the like. Rotary valves are provided for controlling inlet and outlet of catalyst to and from the chambers. Metal baffles may be provided, particularly in the regeneration chamber, to prevent channelling of catalyst. In this type of system also, rather severe erosion problems are encountered, since the catalyst particles, although not moving at a rapid rate, are quite hot, and usually have somewhat rough and angular surfaces which increase their errosiveness. Catalysts used in such systems are manufactured in a manner which will give them as hard a structure as possible, consistent with suitable porosity and activity, in order to minimize attrition losses, and thus are even more erosive than might otherwise be the case.

In addition to overcoming the aforementioned problems, my invention may, in certain instances, at the same time serve to provide a desired amount of catalyst make-up to a system utilizing powdered catalyst. In some modifications, I may provide for control of heat transfer in catalytic systems. Preferred embodiments of the invention permit early detection of failure or wearing away of vessel linings, or building up of deposits on heat transfer surfaces. Various other advantages of the invention will become apparent as the disclosure proceeds.

It is an object of this invention to provide improved apparatus and process wherein erosion and/or corrosion by moving material is minimized. Another object is to provide apparatus suitable for effecting hydrocarbon conversions utilizing a mobile solid catalyst. A further object is to provide improvements in so-called "fluid" catalyst systems wherein difficulties arising from erosion caused by hard catalyst particles moving through the system are mitigated. A further object is to provide powdered catalyst make-up into such a system. An important object is to avoid introduction of finely divided extraneous matter, particularly metal, into mobile catalyst systems. Yet another object is to provide for the determining of the rate of wear of protective surfaces or the like. A further object is to detect changes in the condition of a surface of a body affecting the thermal conductivity of the body. Yet another object is to determine the presence of hydrate deposits on cooled heat-exchange surfaces. Other objects of the invention will be apparent from the accompanying disclosure, discussion, and claims.

Briefly, one general aspect of my invention comprises in preferred modification the combination of equipment suitable for effecting catalytic conversions through the agency of a mobile solid catalyst composition, together with a protective coating on portions of said equipment normally subject to corrosion or erosion by the moving catalyst, said coating being made of one or more components of the catalyst composition itself. The protective coating is desirably compacted into a hard or dense form, as contrasted with the normally porous structure of the catalyst. Not only does this coating protect the fabricated metal or other parts of the apparatus completely from the deleterious action of the moving catalyst hereinbefore referred to, but impingement or abrasion of the catalyst particles against the coating causes only a component of the catalyst composition, rather than extraneous material, to be introduced into the system. Such catalyst component so introduced by action of the moving catalyst on the protective coating is innocuous in the reaction mixture and equipment, since it is a normal component of the reaction mixture, and in some cases may even be turned to considerable advantage as will appear more fully hereinafter; this is to be contrasted with the undesirable and sometimes highly injurious introduction of abraded materials of construction which would otherwise occur. This subject matter is disclosed and claimed in my copending application Serial No. 489,276, filed June 1, 1943, and issued as U. S. Patent No. 2,459,474 on January 18, 1949, of which this application is in part a continuation.

Figure 2:
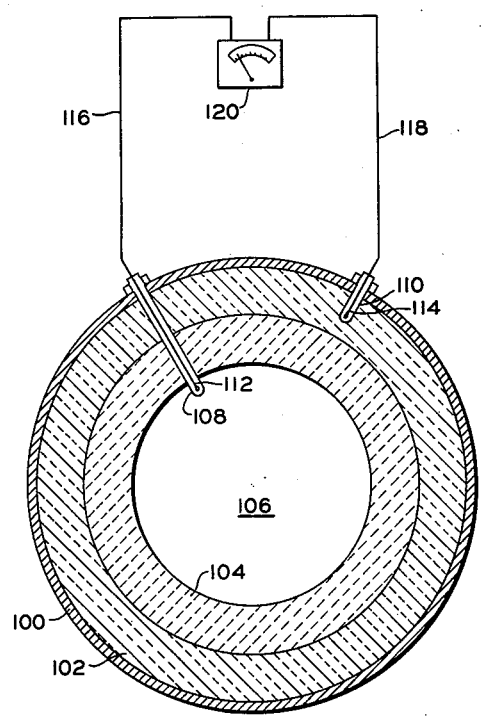

The invention may be more fully understood by reference to the accompanying drawings, Figure 1 shows somewhat diagrammatically in partially cutaway view a preferred arrangement of apparatus suitable for carrying out the "fluid" catalytic cracking of gas oil. Figure 2 shows a diagrammatic cross-section of a cylindrical conduit or reactor designed for high temperature service. The drawings and accompanying description will thus serve to exemplify preferred modes of application of the invention.

In Figure 1, a reaction chamber 10 and a regeneration chamber 12, of somewhat similar or identical construction, are provided. A finely powdered solid cracking catalyst, preferably a synthetic silica-alumina which will pass a 200 mesh screen, flows through each chamber in an endless cycle; active catalyst enters reaction chamber 10 through line 14 and distributor 15, and deactivated catalyst flows out of chamber 10 first by gravity through line 16, and then, by the gas-lift action of air or other regeneration gas introduced via line 18, upwardly through line 20 and distributor 22 into regeneration chamber 12. The regenerated catalyst in turn flows out of chamber 12 by gravity through line 24 and then upwardly through line 14 by virtue of the gas-lift action of the hydrocarbon feed introduced into line 14 via line 26, and on into chamber 10 through distributor 15 for again catalyzing the cracking reaction. It will be seen that a continuous feed of active catalyst and hydrocarbon reactants is thus supplied to the reaction zone, while oxygen-containing gas and deactivated catalyst are continuously supplied to the regeneration zone.

The fresh feed to the system, in this case a Mid-Continent gas oil of 35° API gravity, enters the system via line 28 and is passed into fractionator 30 at a point intermediate the top and bottom thereof. Hot effluents from reactor 10 also enter fractionator 30 via line 32 at a lower point. These hot effluents comprise products of the cracking reaction, including gas and gasoline, and unreacted or partially reacted material boiling above the gasoline boiling range, generally termed "cycle oil." In the arrangement shown, fractionator 30 is so operated that the kettle product therefrom, which passes via lines 34, 26, and 14 to reactor 10, comprises this cycle oil and also the fresh feed introduced via line 28, while the gasoline and lighter fractions are taken overhead via line 36 to conventional fractionation means not shown for additional separation into desired fractions or products. A substantial amount of the sensible heat of the effluents from chamber 10 is thus imparted by direct heat exchange to the incoming fresh feed, which in turn may act as a refluxing medium in fractionator 30. Additional kettle heating and reflux cooling for fractionator 30 may be provided as required by conventional means indicated diagrammatically by heating coil 38 and cooling coil 40. The total feed to reactor 10 passing through lines 34 and 26 may be heated additionally by conventional means not shown, or heat contained in the regenerated catalyst in line 14 may be sufficient to vaporize and heat this feed to reaction temperature. Various other means of conserving heat and effecting heat transfer between feed, effluents, catalyst, etc. may of course be utilized as desired in connection with the system.

Hydrocarbons introduced into the reaction chamber pass upwardly through a loose bed of the catalyst 41 maintained in the bottom of the chamber, and then up through the free space in the upper part of the chamber carrying substantial quantities of catalyst in suspension. The level of the catalyst bed, indicated by reference numeral 42, is readily adjusted to any desired height and in correlation with rate of hydrocarbon feed, temperature, catalyst to hydrocarbon ratio, and other reaction conditions, acts to govern the extent of conversion obtained. This bed is not static, but rather is continuously flowing much as would a liquid, being supplied with fresh catalyst introduced along with hydrocarbon feed through line 14 and distributor 15, while spent catalyst is flowing out through line 16 for regeneration. Of course the bed is in a state of vigorous agitation due to the flow of hydrocarbons therethrough and the very light weight of the individual catalyst particles, a fair proportion of which are carried into the upper portion of chamber 10 in suspension in the gaseous hydrocarbons. This suspension leaves the top of chamber 10 through line 44 and enters cyclone separator 46 or its equivalent, wherein almost all of the suspended catalyst is separated from the hydrocarbon gases, which pass via line 32 into fractionator 30 as heretofore discussed, while the separated catalyst is returned to chamber 10 through line 48. Any small amounts of catalyst powder escaping from separator 46 through line 32 may be separated by means, not shown, such as electrical precipitation or other methods known to the art, or may be separated in fractionator 30 and obtained in the liquid kettle product in suspension therefrom and thus reintroduced into chamber 10.

The catalyst utilized in cracking zone 10 becomes deactivated by deposition of carbonaceous matter thereon and hence must be regenerated. This is accomplished continuously by withdrawing catalyst from chamber 10 by means of line 16, and introducing same into regeneration chamber 12 via line 20 and distributor 22. In chamber 12, the carbonaceous matter is removed from the catalyst by oxidation with air or other oxygen-containing gas introduced through line 18. The flow of catalyst in chamber 12 is similar to that in chamber 10; a flowing bed is maintained, the level of which is indicated at 50, reactivated catalyst is continuously withdrawn via line 24 for reuse in reaction chamber 10, and a suspension of catalyst in regeneration gases is withdrawn via conduit 52 and introduced into cyclone separator 54. In separator 54 most of the catalyst is separated and returned via line 54 to regenerator 12, while the regeneration gases exit via lines 56 and 58. If necessary, a Cottrell precipitator 60 or other means may be interposed for the purpose of recovering traces of catalyst not separated in unit 54. Such recovered catalyst may be removed via line 62 and if desired returned either to zone 10 or zone 12 by means not shown.

Inasmuch as it is desirable to purge spent catalyst of hydrocarbons admixed with or adsorbed thereon prior to its introduction into contact with oxygen-containing gas, steam or other inert gas may be introduced into conduit 16 via line 64. This purge gas is caused to flow into reaction chamber 10 countercurrent to the catalyst, carrying with it material purged from the catalyst which is thus returned to the reaction zone, while the purged catalyst continues on toward regeneration chamber 12. In like manner, oxygen-containing gases and oxygenated material are purged from regenerated catalyst by introduction of a steam purge into conduit 24 through line 66. This purge may also serve to cool the catalyst somewhat if desired. Conduits 24 and 16 may be somewhat enlarged at or near the point of steam introduction or otherwise modified to facilitate the counter-current movement of steam and catalyst without substantially impeding catalyst flow.

Reaction and regeneration conditions may of course be chosen within a rather wide range and will depend largely on the particular stock being cracked and the catalyst used. In the cracking of most gas oils to obtain optimum yields of high-octane-number motor fuel, the reaction temperature will generally be from 850° to 1050° F., the pressure from atmospheric up to 50 or 100 pounds per square inch, the residence time of reactants within the reaction zone from 5 to 50 seconds, and the weight ratio of catalyst to oil fed to the reaction zone will range from a value of about 0.5:1 to about 10:1. The extent of conversion per pass may be relatively low, such as from 10 to 30 per cent, in which case a recycle of unconverted and/or partially converted oil is used, or it may be higher, the once-through type of operation usually obtaining 50 per cent or greater conversion per pass, in which case little or no recycle is used. Cycle oil in this case is usually passed to non-catalytic cracking for better utilization. In the arrangement shown in the drawing, most of the cycle oil is returned for retreatment. However, continued recycle would finally produce a material quite resistant to further catalytic cracking; accordingly, a continuous draw-off of a portion of such material is provided, as by line 68. Other methods of accomplishing the same result are well known to the art, and need not be considered here. In the present example, with a 20 per cent conversion per pass, an ultimate conversion of about 70 per cent to products boiling outside the range of the gas oil feed stock is obtained, with the motor fuel product amounting to about 65 volume per cent of the feed stock.

Regeneration of the catalyst is accomplished at combustion temperatures which are preferably not in excess of about 1400° F. in any case, and which with some catalysts should not exceed 1050° to 1100° F. This temperature will be dependent on the amount of carbon deposited on the catalyst, as well as the temperature and volume of oxygen-containing gas utilized for effecting the oxidation. Since the catalyst itself has a substantial heat-carrying capacity, a relatively high catalyst to oil ratio is frequently used so that the ratio of catalyst to carbon thereon is sufficiently high as to avoid too great a temperature rise in the regeneration chamber. Other means of controlling temperatures, including indirect cooling, use of cool inert gas such as steam, excess air, etc. may also be used as deemed advisable for a given set of conditions.

Regardless of how rugged and heat-stable the catalyst may be, it gradually loses activity, so that a portion must be intermittently or continuously withdrawn from the system, and replaced by freshly manufactured catalyst. Such withdrawal may be through line 68 and/or line 58 or line 62. Make-up catalyst may be introduced by means not shown, or may be provided through the practice of my invention as will be described more fully hereinbelow.

Turning now to the particular construction of the apparatus embodying features of my invention, portions of reaction chamber 10 are shown cut away in the drawing to reveal an outer metallic shell 70, having a protective inner coating 72. This protective coating is composed of the same material as the catalyst. For example, in this instance where a synthetic silica-alumina powder is being utilized as catalyst, the coating 72 is also made from this material. It will be appreciated that only a very small proportion, if any, of the conversion is effected by virtue of any catalytic effect of this coating, since the powdered catalyst is provided for this purpose, being highly efficient due to its large surface area per unit of weight and its intimate admixture with reactants. Thus the protective coating of the instant invention, although composed of a component or all components of the catalyst, is effective primarily when utilized in conjunction with systems designed specifically for the utilization of mobile catalysts such as those described herein, and functions to protect parts of the apparatus normally adversely affected by action of the mobile catalyst, and in other special ways as disclosed herein.

In addition to the inner walls of the reaction chamber 10, other parts of the apparatus are similarly coated, particularly the inner walls of conduits carrying the catalyst alone or in suspension, and the cyclone separators. It will be seen that it is in these conduits and in the cyclone separators that the catalyst particles move with the highest velocities, and undergo changes of direction whereby certain areas in particular are subjected to impingement of a large number of the rapidly moving solid particles. Portions of conduits 44, 48, and 20, and cyclone separator 46 are shown cut away in the drawing, revealing protective coatings indicated by the numerals 74, 76, 78, and 80 respectively. Baffles in the separator are also covered by the coating. The regeneration chamber 12 and conduits and cyclone separator associated therewith are similarly protected.

A particularly useful function of my protective coating is that it not only protects the apparatus against erosive and/or corrosive effects of the moving catalyst but also may be so applied as to provide substantial insulation of the outer shell or other part of the apparatus against the high temperatures prevailing within said apparatus. This is especially advantageous in conduits, since it is generally desirable to minimize heat losses therefrom. This internal insulation means that the outer shells need not be fabricated to withstand the high temperatures to which they normally would be subject, with consequent savings in valuable metals, or the provision of greater safety factors for a given construction. The shells or the like may also be constructed from ordinary materials rather than special alloys, since they are not subject to the normal erosion and high temperatures.

As stated before, it is preferred that the protective coatings of this invention be relatively dense and hard, as compared with the light, porous structure normally imparted to the catalyst proper in its manufacture. To this end, it is found best to subject the aforesaid coatings to relatively high compacting pressures while same are being fabricated or installed. This also serves to minimize catalytic activity at the surface of the coating, which is generally preferably avoided. One of two methods is ordinarily utilized in preparing these protective coatings. The linings of chambers, conduits, return bends, cyclone separators, and the like may be prefabricated to the proper size and shape and then put into place. This has the advantage of a simpler control of fabrication conditions, with equipment especially adapted thereto. However, they may also be placed in situ, particularly on irregular surfaces, as by spraying, plastering, or other suitable techniques which will be readily understood. The lining material need not be of exactly the same composition as the catalyst, but will be approximately the same, or will at least comprise a component of the catalyst, as disclosed herein. Binders, fillers, lubricants, or other such material which is innocuous in the system may be admixed therewith in minor amount to facilitate manufacture and/or to improve the mechanical strength and/or resistance to abrasion. Frequently the catalytic component is mixed with water, or other liquid, formed into desired shape or applied to the surface in question under substantial pressure, and then calcined. As an example, in the case of silica-alumina catalysts, a hydrated silica is prepared having a considerably higher silica content than that used in preparing the mobile catalyst proper. This hydrated silica, either alone or activated with minor amounts of adsorbed or co-precipitated alumina, may if desired be admixed with from 1 to 15 per cent of finely powdered graphite, gypsum, or other filler or binder, applied to the surface to be protected under about 1000 pounds' pressure, and then slowly heated and dried to a water content of say 15 to 25 per cent. At this point another coating of the same material may be applied, or the heating may be continued to a temperature somewhat above those to be encountered during operation. The high silica content of the original hydrogel aids in producing a relatively dense protective coating which has relatively little catalytic effect per se in the apparatus compared to that of the moving catalyst powder, but small particles abraded from this coating by the moving "fluid" catalyst have a catalytic activity approaching that of the catalyst proper and sufficient to provide a portion of the normal catalyst make-up for the system described. The coating is applied to a depth such that the final thickness is usually at least one inch and may be greater at points of greatest wear, and/or where its thermal insulative value is of importance.

The apparatus is constructed to facilitate replacement of the protective coating wherever and whenever required. In order to determine when this is necessary, I may advantageously embed a thermocouple, resistance thermometer, or similar thermo-sensitive means in the coating at one or more points subjected to greatest wear. The thermocouple 82 is shown in the drawing embedded in the lining 80 of cyclone separator 46. Preferably it is fairly deep in the coating, that is near the metal wall of the separator. An indicator 84 such as a potentiometer, shows the temperature of the thermocouple, which will of course vary with the thickness of coating between t and the contents of the separator. As this coating wears away, the indicator will show an increasing temperature, and one may readily determine, by preliminary calibration or otherwise, at what point the protective coating is sufficiently worn away to expose the thermocouple or to require replacement. Likewise if the coating becomes cracked allowing hot gases to flow between t and the metal shell, or if such gases work their way behind the coating at a point in the coating, the temperature indication increases showing a need for inspection and repair. This particular arrangement is very useful in this connection, and may of course be utilized in other situations for measuring or determining total amount of wear or rate of wear of a surface or body.

In addition to the specific application just described, the principles of my invention may also be applied to other situations in which heat passes through a surface of a body into the body and the characteristics or condition of the surface may so change as to affect the overall heat transfer coefficient of the body. Thus, the characteristics or conditions in question may involve a corroding and/or eroding away, as discussed above with reference to Figure 1; or a break in such a lining or other type of lining as described hereinbelow with particular reference to Figure 2 or a by-passing of hot gases behind a vessel lining, which, if not detected immediately and corrected, will rapidly destroy the liner construction by eating away the liner itself or an intermediate liner or will subject the outer vessel wall to a more intense heat than it can withstand. The invention is in no way limited to high temperature operations, although such are the most commonly encountered. For example, I may detect a build-up of solid deposits on a heat transfer surface, such as a water-cooled condenser or a refrigerated heat-storing body employed for cooling and dehydrating air by the Linde-Frankl air liquefaction process or modifications thereof. In the latter case moisture and/or $CO_2$ deposits out on the cold surfaces, and this is desired up to a certain limit, after which the exit gases will be insufficiently dehydrated and finally the deposition of such hydrates and the like may unduly restrict flow of gases through the apparatus. For this reason it is desirable to be able to determine readily when hydrate formation occurs to an undesired extent or occurs at a point normally free of such formation. In the cooling of hydrocarbon gases, particularly where same are condensed at normal atmospheric temperature or somewhat below or above such temperaure, hydrocarbon hydrates are sometimes formed and their formation may also be detected by applying my invention.

In discussing the last mentioned problems of hydrate and other solid deposit formations on cool heat transfer surfaces, I mean not only refrigerated surfaces but also those which are cooler than the fluid in contact with same although the absolute temperature may be above atmospheric temperature. I ordinarily prefer to place a thermo-sensitive device, usually a thermocouple, directly on the heat exchange surface at the point where hydrate formation or the like is most likely to occur, or where its occurrence would be most detrimental. It is preferred to enclose the thermocouple within a protective sheath such as a thermocouple well or other construction known and understood by those skilled in the art, in order to protect the couple from action of fluids being processed and from mechanical action of the solid deposits. Where a substantially constant temperature is maintained at any given point in the system the temperature indicated will remain constant until solid deposits begin to accumulate thereon. At such time the rate of heat transfer through the surface into the cooler body is altered by the presence of the deposited solids, and the temperature of the thermocouple will decrease and tend to approach the temperature of the surface itself. Such a decrease as noted by visual inspection of an indicator, by visual inspection of the chart of a continuously recording instrument, or by automatic warning or other means associated with a temperature controller preset for a given drop in temperature, warns the operator that action should be taken to avoid further deposition. Where temperatures vary within the system, such as when a heat-absorbent body is refrigerated by contact with cold gaseous nitrogen or other components in the production of liquid air, and then used to cool incoming air, it will ordinarily be preferred to determine both the temperature of the inlet air going past the heat exchange surface and also the temperature at that surface, so that $\Delta T$ serves as a measure of the heat transfer rate of the surface and consequently of the rate of deposit of solids thereon. Since extreme temperature variations may be encountered from one part of a cycle to another, a calibration will ordinarily be made of the normal temperature changes, and deviations therefrom will be the indication of hydrate formation.

Attention is now directed to Figure 2, showing in cross section an insulated conduit or furnace construction. As a matter of practice both simple conduits for carrying high temperature fluids, and furnaces or reactors designed for high temperature operation, are designed similarly, in that an outer metal shell is employed, together with an intermediate insulating liner, usually made of insulating bricks or other insulating material, and an innermost inner liner of alloy metal or "super" refractory capable of withstanding the actual temperatures within the equipment.

Examples of conduits of this type are those employed as inlets and outlets for catalyst cases for high temperature dehydrogenation of hydrocarbons such as butanes and butenes, wherein flow of hydrocarbons is sometimes alternated with flow of hot oxygen-containing gases for reactivating the catalyst; see for example the conduit disclosed in U. S. Patent 2,423,213 of L. J. Weber. Examples of furnaces and reactors are those presently known as pebble heaters wherein a moving mass of pebbles passes through a zone in contact with hot combustion gases for heating the pebbles and then through another zone where its heat is given up to steam or hydrocarbon reactants. Another instance of a high temperature reactor is the furnace employed for making a special type of furnace carbon black known as "Philblack," wherein the inner liner is made of a refractory brick capable of withstanding high temperatures and a layer of insualting refractory brick is innerposed between the inner liner and the outer steel shell; this furnace is a horizontal cylinder in general shape, and a mixture of hydrocarbon gas and air is passed therethrough tangentially while an oil feed is passed longitudinally therethrough.

Figure 2 is a diagrammatic showing which may be taken as representative of any of the foregoing types of apparatus. In Figure 2 an outer carbon steel shell 100 is employed which can withstand a temperature of 1000 to 1200° F. An insulating liner 102 is built up of refractory bricks or other suitable material; various forms of alumina may be employed as desired. An innermost liner 104 is made either of alloy metal such as a high chromium content steel, or a "super" refractory such as silicon carbide or silica capable of withstanding say 2500° F. Hot gases pass through the inner part of the chamber 106. A first thermocouple well 108 passes from the outside through all three liners into the space 106. A second thermocouple well 110 passes through the outer shell into the insulating liner as shown. Thermocouples 112 and 114, respectively, are used in the aforesaid wells, and are connected by leads 116 and 118, respectively, to a differential temperature recorder 120. This device 120 may either merely indicate, or it may record, differences in temperature between the two thermocouples. Particularly when the hot gases passing through the conduit or furnace vary appreciably in temperature from time to time, this detection of the difference in temperature ($\Delta T$) between the thermocouples gives a very satisfactory indication of changes in condition in the inner lines 104. As this liner gradually wears away $\Delta T$ will gradually increase. If the liner becomes cracked, or if hot gases begin to pass behind the liner and eat away at insulating liner 102, a marked change in $\Delta T$ occurs, with the temperature of thermocouple 114 approaching that of thermocouple 112. Such passage of hot gases may be caused either by a crack in liner 104 allowing the gases to pass therethrough or by passage of gases around the outside of liner 104 at joints in the system. My invention makes it possible to indicate these changes in condition of the liner before extensive damage is done.

While described with particular reference to the "fluid" cracking of hydrocarbons, the invention may be applied to other chemical conversions carried out with similar methods of contacting catalyst with reactants. It may also be applied to moving-catalyst-bed cracking or other conversions, in which the grinding action of the granular catalyst is frequently found to be quite severe in conventional installations. Among other systems to which my invention may be applied may be mentioned, merely by way of example, isomerization or other conversions of hydrocarbons wherein a catalyst composition comprising an active metal halide, such as aluminum chloride, along with a finely divided solid inorganic filler or promoter material, such as brucite, bauxite, magnesia, alumina, other naturally occurring or synthetically produced metal oxides, magnesite, asbestos, fuller's earth, bentonite, talc, etc. is utilized in the form of a slurry which is circulated in or through a reaction zone in admixture with hydrocarbons. Patent application Serial No. 442,269 by W. A. Schulze now U. S. Patent No. 2,374,507, issued April 24, 1945, discloses such an isomerization system. In such case the component of the catalyst composition chosen as protective material is usually the metal oxide or other solid material used as support or extender for the more active metal halide component of the catalyst. This minimizes corrosion and erosion of metal or other equipment, which is particularly severe with active metal halide catalysts, and also may be utilized to prevent introduction of undesired iron or other metal compounds into the system, which, especially in the case of aluminum chloride-containing catalysts, normally greatly diminishes catalyst activity and life. As another example may be mentioned the recovery of diolefins by contacting a diolefin-containing stream with finely divided cuprous chloride or other halide of a heavy metal of group I or II of the periodic system, and disclosed in patent application Serial No. 478,427 by I. L. Wolk, now U. S. Patent No. 2,386,734, issued October 9, 1945. A cuprous halide-diolefin complex is formed, separated, and decomposed in suspension in an inert gas to recover the pure diolefin and the cuprous halide. In this instance the parts of the apparatus particularly subject to erosion may be coated with the cuprous halide, preferably in dense form. Yet another example to indicate the possible scope of my invention is in the adsorption of certain constituents of a gas mixture by solid adsorbents such as activated charcoal, silica gel, activated alumina, and the like, wherein the solid particles are moved through the system. Other applications of the principles of the invention will be obvious to those skilled in the art in view of the detailed disclosure herein.

I claim:

1. In combination, a reactor having an exterior liner portion of heat-resistant material, an inner liner portion of heat resistant material secured to said exterior portion and exposed to conditions within said reactor, a first temperature sensitive device located within said outer liner adjacent the surface of said inner liner, a second temperature sensitive device extending through both liners into the reaction zone and measuring the temperature within said refraction zone, and an indicator responsive to said temperature sensitive devices.

2. An apparatus in accordance with claim 1 in which the temperature sensitive devices are thermocouples.

References Cited in the file of this patent

UNITED STATES PATENTS

| Number | Name | Date |
|---|---|---|
| 921,083 | Chaney | May 11, 1909 |
| 1,599,360 | Hechenbleikner et al. | Sept. 7, 1926 |
| 1,901,389 | Hazard-Flamand | Mar. 14, 1933 |
| 1,957,051 | Norton | May 1, 1934 |
| 1,975,832 | De Florez | Oct. 9, 1934 |
| 2,105,479 | Hayes | Jan. 18, 1938 |
| 2,264,968 | De Forest | Dec. 2, 1941 |
| 2,330,599 | Kuehni | Sept. 28, 1943 |
| 2,404,474 | Collins | July 23, 1946 |
| 2,460,052 | Werner | Jan. 25, 1949 |
| 2,477,751 | Johnson | Aug. 2, 1949 |

FOREIGN PATENTS

| Number | Country | Date |
|---|---|---|
| 713,640 | France | Aug. 17, 1931 |